Dec. 18, 1923.

B. F. SEYMOUR 1,477,911

RESILIENT TRANSMISSION AND BEARING

Filed Sept. 9, 1919    2 Sheets-Sheet 1

Inventor:
B. F. Seymour,
Atty.

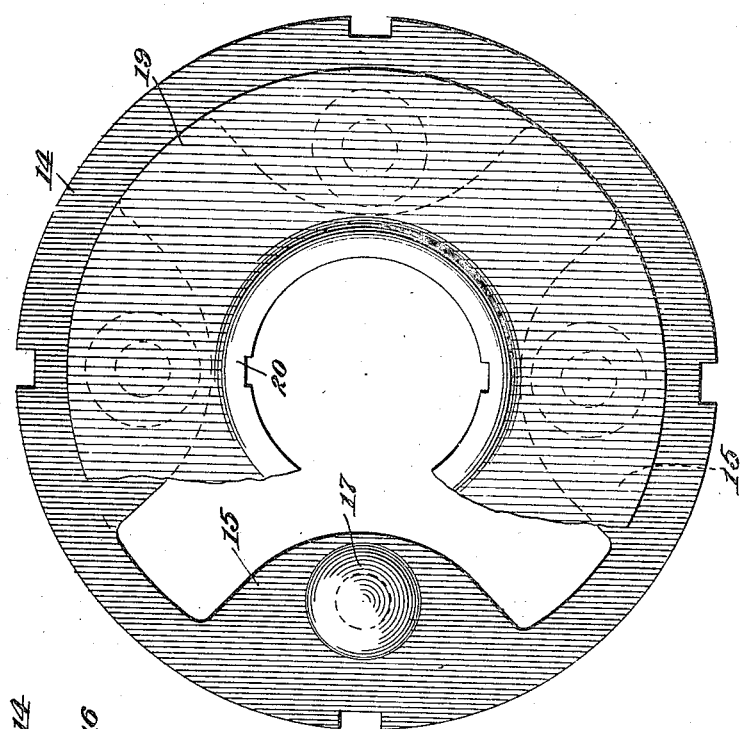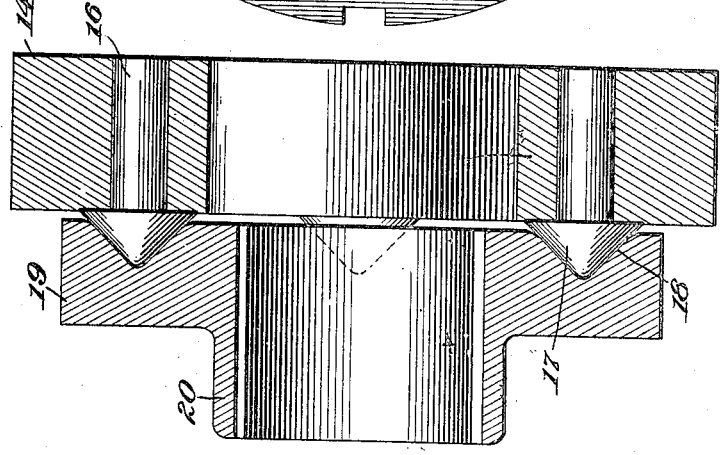

Patented Dec. 18, 1923.

1,477,911

UNITED STATES PATENT OFFICE.

BENJAMIN F. SEYMOUR, OF INDIANAPOLIS, INDIANA.

RESILIENT TRANSMISSION AND BEARING.

Application filed September 9, 1919. Serial No. 322,627.

*To all whom it may concern:*

Be it known that I, BENJAMIN F. SEYMOUR, a citizen of the United States, residing at Indianapolis, in the county of Marion and State of Indiana, have invented certain new and useful Improvements in Resilient Transmissions and Bearings; and I do hereby declare the following to be a full, clear, and exact description of the invention, such as will enable others skilled in the art to which it appertains to make and use the same.

The present invention relates to resilient transmissions and bearings, more particularly for vehicle wheels, and consists in the combinations and arrangements of elements hereinafter described and particularly set forth in the accompanying claims.

The purpose of the invention is to provide a flexible or resilient transmission between a driving and a driven element adapted to positively transmit the driving force whether said elements are in or out of concentric relation; and one which will readily accommodate itself under all normal working conditions to which said elements may be subjected.

A further purpose of the invention is to provide a combined resilient transmission and bearing for a vehicle wheel to the end that such a wheel may possess the desired resilient qualities and also give the necessary transmission medium between the wheel proper and the motive power of the vehicle.

The construction herein shown is proposed as an embodiment of, or improvement over the types of resilient transmission and bearing disclosed in my co-pending applications for U. S. patents bearing the Serial Numbers 302,415 filed June 7, 1919, 302,416 filed June 7, 1919, and 310,970 filed July 15, 1919.

The arrangement shown herein is characterized in that uniformly distributed and co-operable cone elements are provided for the driving and driven element to the end of obtaining equal and uniformly distributed pressure under all working conditions, whereby to obtain maximum efficiency and ease of operation.

Figure 2:
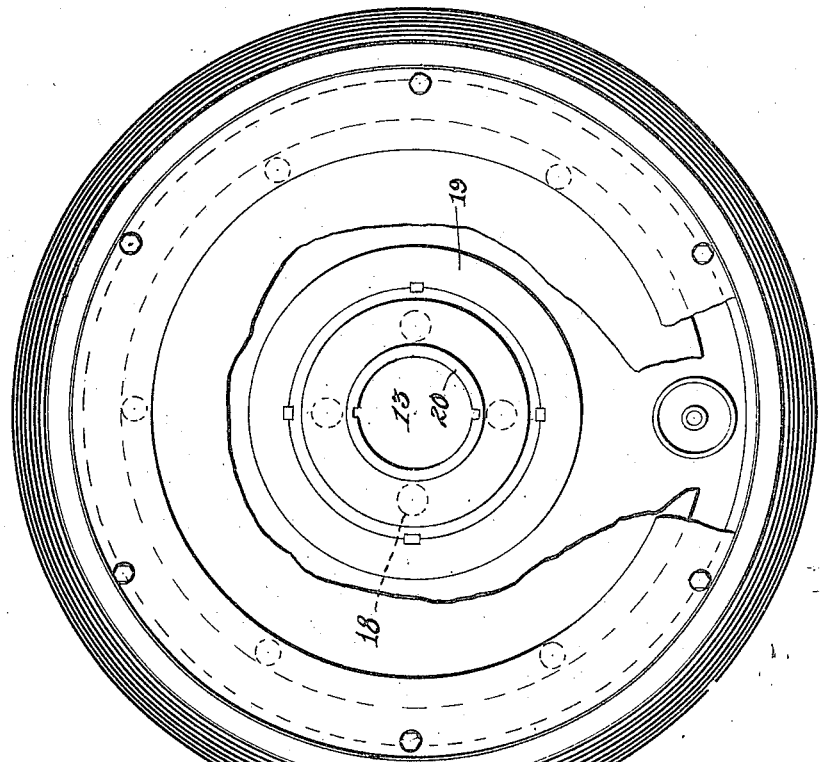
Figure 1:
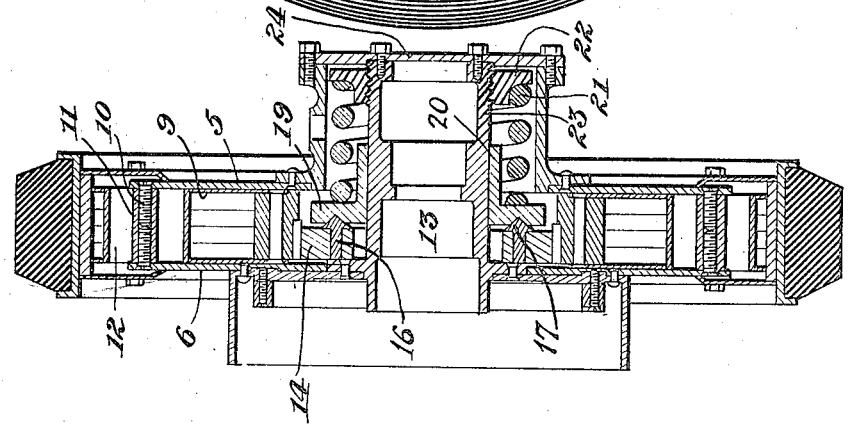

The invention is shown by way of illustration in the accompanying drawings wherein, Figure 1 is a central sectional view showing the application of the device to a vehicle wheel, Figure 2, a side elevational view thereof, Figure 3, an enlarged detail view, partly in section, of the transmitting and bearing elements per se, and Figure 4 is a similar view thereof taken at right angles to Figure 3.

Referring to the construction in further detail the construction consists of a hub portion formed of two side plates, or housing members 5 and 6 which are disposed against the inner rim portion 9 of the wheel, as shown. The two hub members 5 and 6 are secured to the wheel rim by the series of pairs of bolts 10 screwed into threaded sleeves 11 that serve as spacing elements and which are located within the spaces, or chambers, 12, as indicated in Figures 1 and 2. It will be understood of course that said spaces 12 are provided to allow the wheel rim to have limited radial movement with respect to the axis 13 of the wheel.

The resilient transmission and bearing device per se consists of an inwardly disposed flange 14 formed on or detachably secured to the wheel rim portion 9, and constructed to provide a plurality of uniformly distributed and centrally disposed segmental sections 15 (see Figs. 3 and 4). The several segmental portions 15 are each apertured to receive the shank 16 of a cone head 17, which provides cam elements that co-operate with the complemental cam elements 18 formed on the flange or radial portions 19 of the sleeve 20. The sleeve 20 having the several recessed cones, is held in operative position and under the required tension by the spring 21, which seats against the portions 19 of the sleeve at one end and against the adjustable collar 22 on wheel hub 23, at the other end thereof. Said collar is adjustable on the wheel hub 23 for regulating the tension of the spring 21, as shown.

The sleeve 20 is provided with key-ways to receive keys (as shown) on hub member 23. And the removable closure plate 24 readily permits of access for adjusting said collar 22 to regulate the tension on the spring 21 as will be understood.

It will therefore be seen from the foregoing that any motion or shock of the shaft or axle will transmit a like movement to the wheel hub and this will be resiliently taken up by the cooperating cone elements together with the spring.

It will be obvious of course that different forms of construction may be provided in lieu of that disclosed and described herein.

And while I have shown and described certain apparatus for accomplishing the result initially stated it is to be understood that I am not limited to the precise details shown but may on the other hand adopt such modifications or changes within the scope of the claims as may better suit the end in view.

What I claim is:

1. In a combined resilient bearing and drive for vehicle wheels the combination of a hub member, a wheel rim mounted to have limited radial movement thereon, said rim provided with a separate central portion disposed in bearing relation to one side of the hub, a sleeve mounted to have axial movement on said hub member, cone heads mounted on the said central portion of the rim, said sleeve having cone recesses engaged by said cone heads, and a spring mounted on the hub and sleeve holding said cone elements in engagement, substantially as set forth.

2. In a combined resilient bearing and transmission for vehicle wheels the combination of a hub member having a laterally extended portion providing a chamber, a wheel rim mounted to have limited radial movement on the hub member, said rim provided with a detachably secured central portion disposed in bearing relation to one side of the hub member, a sleeve mounted to have axial movement on said hub member within said chamber, cone heads mounted on the said central portion of the rim, said sleeve having cone recesses engaged by said cone heads, and a spring mounted on the hub and sleeve within said chamber holding said cone elements in engagement.

In testimony whereof I affix my signature.

BENJAMIN F. SEYMOUR.